(12) United States Patent
Grewell et al.

(10) Patent No.: US 6,528,755 B2
(45) Date of Patent: Mar. 4, 2003

(54) LIGHT GUIDE FOR LASER WELDING

(75) Inventors: David A. Grewell, Waterbury, CT (US);
Justin R. Bickford, Bedford, NH (US);
Donald C. Lovett, Shelton, CT (US);
Paul A. Rooney, Rochester, NY (US)

(73) Assignee: Branson Ultrasonics Corporation, Danbury, CT (US)

( * ) Notice: Subject to any disclaimer, the term of this patent is extended or adjusted under 35 U.S.C. 154(b) by 0 days.

(21) Appl. No.: 09/832,306

(22) Filed: Apr. 10, 2001

(65) Prior Publication Data

US 2002/0008089 A1 Jan. 24, 2002

Related U.S. Application Data (60) Provisional application No. 60/196,559, filed on Apr. 11, 2000.

(51) Int. Cl.$^7$ ............................................. B23K 26/20
(52) U.S. Cl. ................................................. 219/121.63
(58) Field of Search .................. 219/121.6, 121.63, 219/121.64, 121.73, 121.85, 1

(56) References Cited

U.S. PATENT DOCUMENTS

| | | | |
|---|---|---|---|
| 3,740,113 A | * | 6/1973 | Cass ........................... 350/312 |
| 5,304,171 A | * | 4/1994 | Gregory et al. ................ 606/15 |
| 5,567,471 A | * | 10/1996 | Harrington et al. ....... 427/163.2 |

OTHER PUBLICATIONS

"Insights", American Welding Society Show Issue, vol. 13, No. 2, Mar. 2000, Arcwise—Plastics—Laser Welding Offers Some Real Advantages, p. 6.

* cited by examiner

*Primary Examiner*—Samuel M. Heinrich
(74) *Attorney, Agent, or Firm*—Harness, Dickey & Pierce, P.L.C.

(57) ABSTRACT

The present invention is directed to a method and apparatus using a light guide for directing a laser beam to a weld zone. The light guide includes an entrance end, an exit end and a flexible body therebetween. The entrance end of the light guide is operatively coupled to a laser source such as a diode and is adapted to receive and communicate the laser radiation through the light guide. The light guide is formed of a flexible material to permit the exit end of the light guide to be spaced from and aligned with complex two-dimensional and three-dimensional weld zone configurations. The internal reflection of the light guide contains the laser radiation therein as it passes from the entrance end and through the exit end of the light guide. The light guide and corresponding methods of welding parts permit laser welding of complex geometric configurations.

24 Claims, 9 Drawing Sheets

LIGHT GUIDE FOR LASER WELDING

This application claims the benefit of United States Provisional Application No. 60/196,559 filed Apr. 11, 2000.

BACKGROUND OF THE INVENTION

1. Technical Field

The present invention relates to laser or infrared welding of parts and, more particularly, to a guide for conveying laser energy to a weld zone.

2. Discussion

The art of welding parts incorporates a variety of techniques including ultrasonic welding, heat welding, and, most recently, Through Transmission Infrared (TTIr) welding of plastic parts. During TTIr welding, laser radiation of a suitable wavelength is passed through a first transparent plastic part and impacts an absorbent polymer whereupon the absorbent polymer is heated to a critical melting temperature. When the absorbent polymer part begins to melt, the parts are pressed together. A weld or bond joins the parts as the melt cools.

While the area of TTIr welding has seen considerable advancement, difficulties related to the integrity and uniformity of the weld as well as controlling the transmission of the laser energy to the weld zone remain as some of the barriers to widespread commercial application of TTIr welding. In most TTIr systems a spot laser tracks the weld line either through movement of the laser or the workpiece. An alternative approach is to illuminate the entire weld zone through a coordinated alignment of laser diodes. The simultaneous illumination approach provides numerous advantages including the speed at which the weld is created and the uniformity of the resulting bond. However, simultaneous illumination of the entire weld surface requires precise alignment of the laser diodes relative to the workpiece. In weld zones consisting of linear or simple geometric configuration, the alignment of the diodes do not present a significant impediment to use of TTIr welding technology. However, for weld zones having complex two-dimensional or three-dimensional curvatures, diode alignment is a significant concern. For welds with complex curvatures the diode mounting manifolds must permit three-dimensional rotation and three-dimensional translation of the diodes for proper alignment. The configuration of the manifold will often times be different for each application and, in some instances, may be cost prohibitive.

An additional difficulty related to the configuration of the diode array is that the individual diodes within an array are generally aligned to slightly overlap one another to provide uniform energy along the weld zone. In this configuration, failure of a diode or diode element called an emitter creates an area within the weld zone that is subjected to less laser energy during welding. A weakness in the weld may result. While feedback circuits may be used to detect a failed diode and prevent the manufacture of a large number of defective parts, the failed diode should be replaced prior to further production.

SUMMARY OF THE INVENTION

The present invention focuses on a method and apparatus for directing a laser beam to a weld zone for infrared/laser welding. While the present invention may be most applicable for use in TTIr welding, it may also be used in other modes of infrared/laser welding such as surface heating. The invention permits mounting of the laser diodes in a configuration that need not directly correspond to the configuration of the weld zone. The laser energy generated by each diode is transmitted through a transparent flexible sheet of material referred to herein as a light guide. The entrance and exiting surfaces of the light guide are generally smooth to minimize diffusion and the light guide is preferably formed of a flexible material that provides total internal reflection. The light guide may be contoured such that its exit surface matches the weld contour while allowing the diodes to be mounted in a dissimilar configuration such as on a flat manifold.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given here below and the accompanying drawings, wherein.

DETAILED DESCRIPTION OF THE PREFERRED EMBODIMENT

Figure 1:
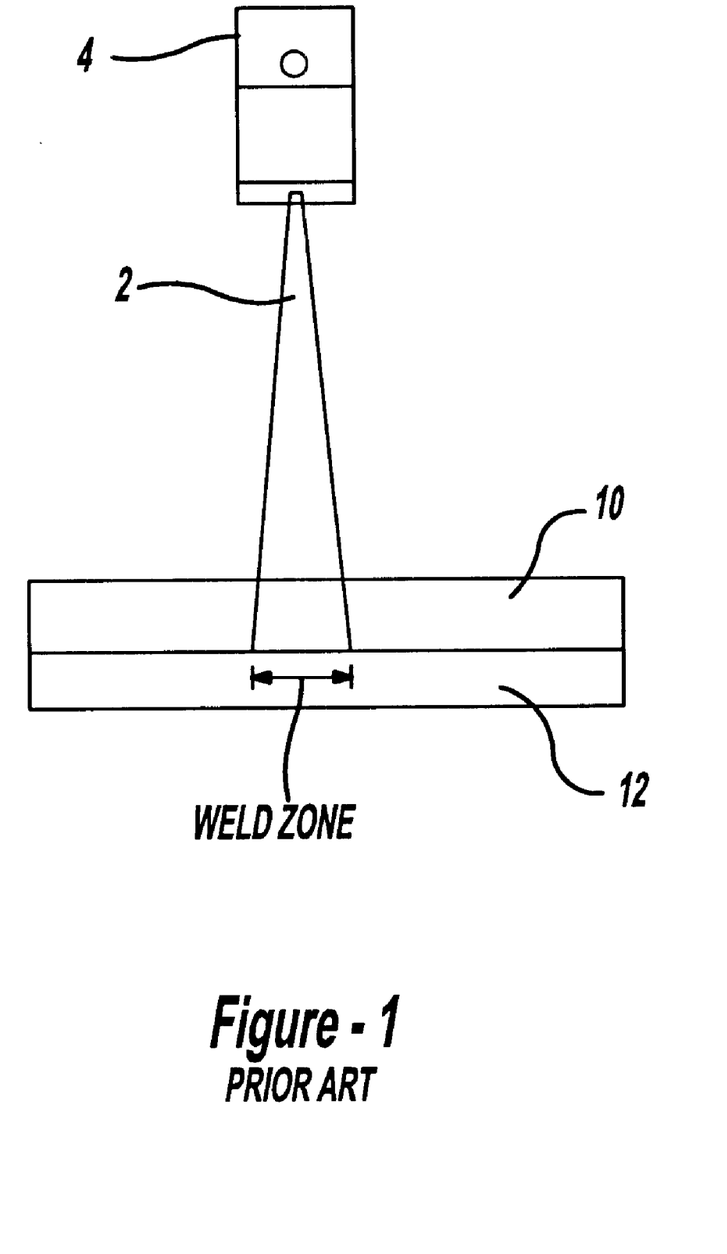
FIG. 1 illustrates a conventional diode configuration for TTIr welding of plastic parts.
Figure 2:
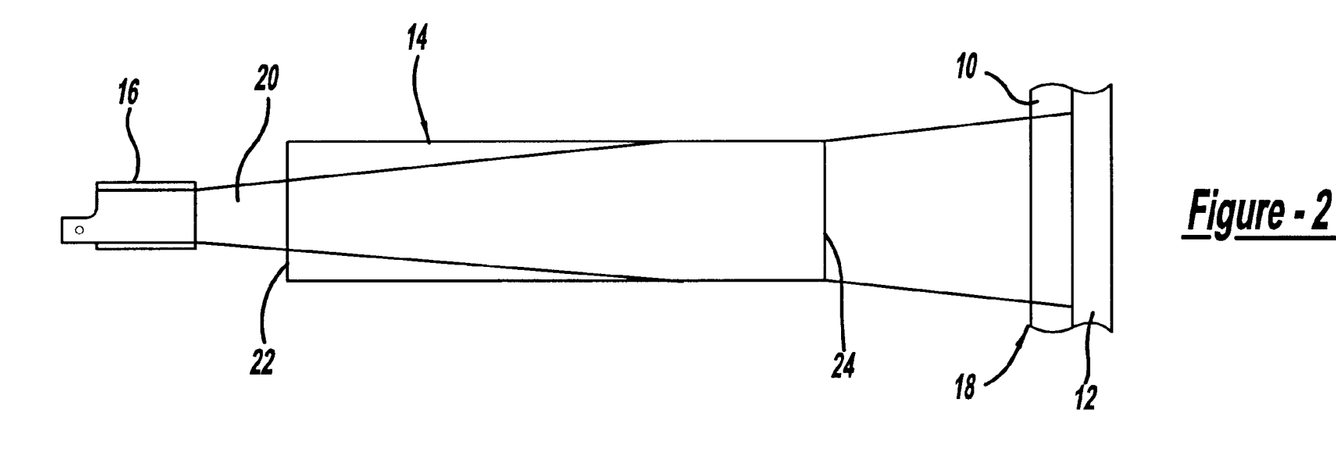
FIG. 2 is a top plan view of a first embodiment of the present invention.
Figure 3:
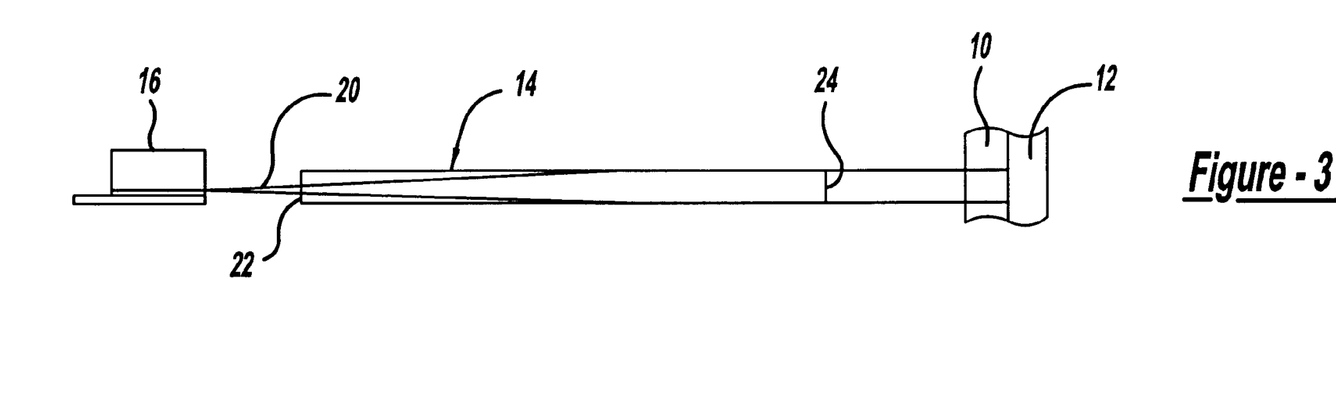
FIG. 3 is a side elevational view of the welding setup shown in FIG. 2.

FIG. 1 illustrates a commonly used practice in laser welding wherein laser radiation 2 from a source such as a diode 4 is used to weld parts. The light or laser radiation 2 is ideally one hundred percent transparent to a clear, transparent part 10 of the plastic being welded but absorbent by another or a black part 12. As noted above, in order to illuminate the entire weld surface using this approach, a series of diodes are commonly positioned in side-by-side relation in a diode array to produce one line that matches the contour of the weld line. The task of aligning and mounting the diodes becomes increasingly difficult as the complexity of the weld zone geometry increases. Accordingly, some of the major problems inherent in the use of conventional diode arrays include the placement, alignment, power uniformity, and fixturing of the diodes.

Figure 11:
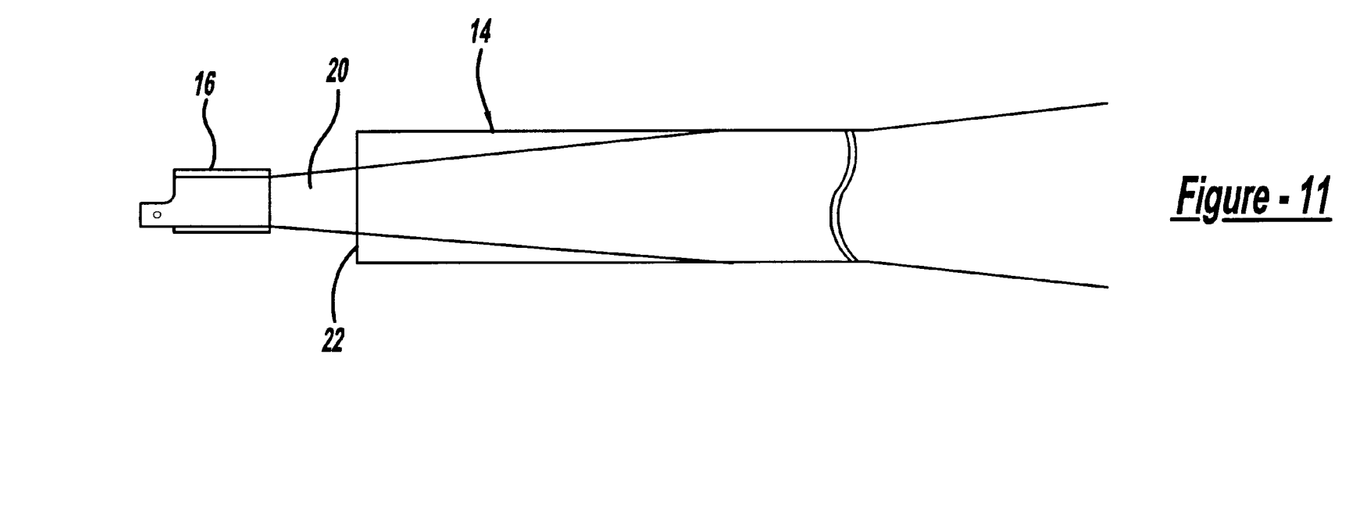
FIG. 11 is a top elevational view of the present invention wherein the light guide is deformed in two dimensions.
Figure 12:
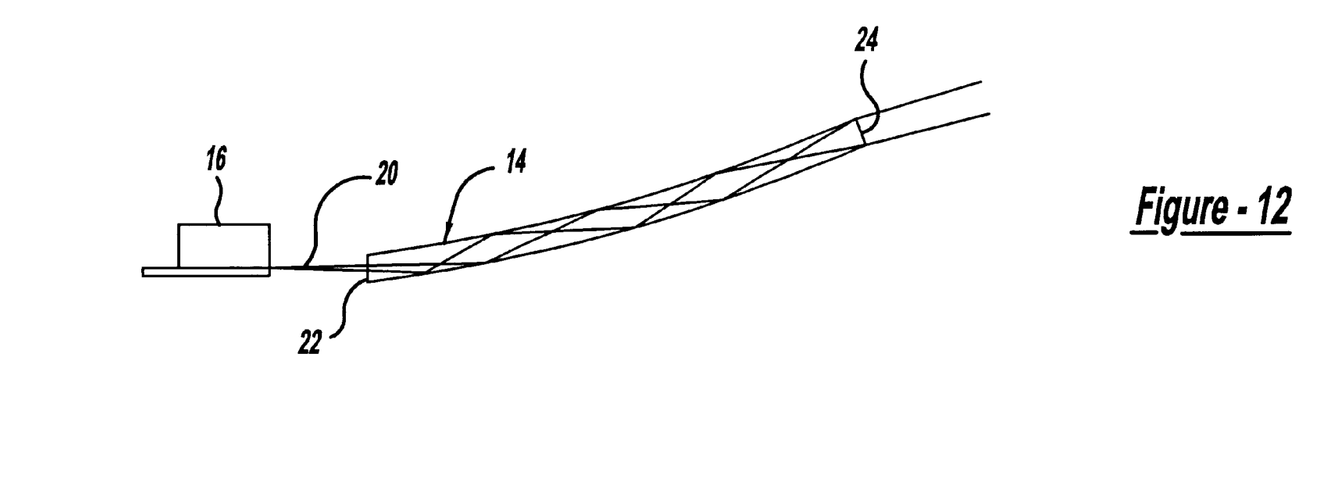
FIG. 12 is a side elevational view of the diode and light guide shown in FIG. 11.

The improved welding technique and the light guide of the present invention are illustrated in FIGS. 2–14. As is shown, a light guide 14 is placed between a laser diode 16 and a workpiece 18 so as to act as a two-dimensional fiber optic cable. The laser diode 16 produces a line of radiation 20 that is retained within the light guide 14 between an entrance surface 22 and an exit surface 24 due to the one hundred percent internal reflection of the light guide 14. The light guide 14 is preferably made of a flexible sheet of material such as rubber, silicone rubber or any transparent thermoplastic that can be molded or deformed into the desired shape as shown in FIGS. 11 and 12 and described below. It is also possible to construct the light guide 14 from transparent fibers mounted in a manner to form a geometry similar to a sheet. The flexibility of the light guide 14 allows the laser radiation to be directed to a weld zone without complex mechanical devices for alignment or manipulation. Further, the flexibility of the sheet allows relatively complex three-dimensional curvatures within the weld contour to be relatively easily and inexpensively matched.

The exit surface 24 of the light guide 14 is preferably spaced from the workpiece 18 and oriented to ensure that the laser impacts the workpiece 18 in an appropriate location. Once sufficient heat is generated in the workpiece 18 to provide an adequate melt along the inner face of the transparent and absorbent parts 10 and 12, respectively, the radiation is turned off and the melts are allowed to wet or adhere and then solidify to produce the weld. Mixing and solidification of the weld is commonly promoted by the application of pressure to the workpiece 18.

As noted above, the invention overcomes many problems in the art including placement, alignment, and fixturing of the array of diodes as well as power uniformity generated by the assembly. This description will initially discuss the preferred properties and operations of the light guide 14 itself followed by the power uniformly achieved through use of the light guide 14 and an exemplary method and structure for operatively aligning the exit surface 24 of the light guide 14 relative to the workpiece 18. The light guide 14 is preferably formed of a flexible and transparent thermoplastic which can be molded into its desired shape. The magnitude of flexibility provided by the light guide 14 may be varied for any suitable application. In fact, a rigid light guide material may be most suitable in certain applications. Moreover, the light guide 14 may consist of multiple layers or fibers of material in order to optimize the light carrying properties of the light guide 14 while providing adequate structural support.

Another important property of the light guide 14 is that the material provides nearly one hundred percent internal reflection so that the entirety of the laser beam 20 is maintained within the light guide 14. To this end, the light guide 14 has a higher optical density than air.

The light guide 14 preferably can have diffusion properties that provide a uniform beam across the entire surface area of the exit surface 24. The entrance and exit surfaces 22 and 24, respectively, will normally be smoothly polished to encourage the transmission of the laser radiation 20 into and out of the light guide 14. In general, it is preferred that the entrance and exit surfaces 22 and 24 are "optically smooth", that is, that the image quality on each side of the entrance and exit surfaces 22 and 24 are consistent. It has been determined that when using a plastic sheet as the light guide 14, the entrance or exit surfaces 22 and 24, respectively, may be polished with sand paper and then brushed with a flame to produce an optically smooth edge to minimize light losses. Notwithstanding this example, a variety of techniques generally known in the art may be used to provide an optically smooth edge for other light guide materials. Another available technique for minimizing the resistance to laser radiation 20 at the entrance and exit surfaces 22 and 24, such as when the light guide 14 is formed of silicone rubber, is to couple a glass plate or other smooth and transparent material at the entrance surface 22 using an appropriate adhesive such as silicone caulking.

Figure 4:
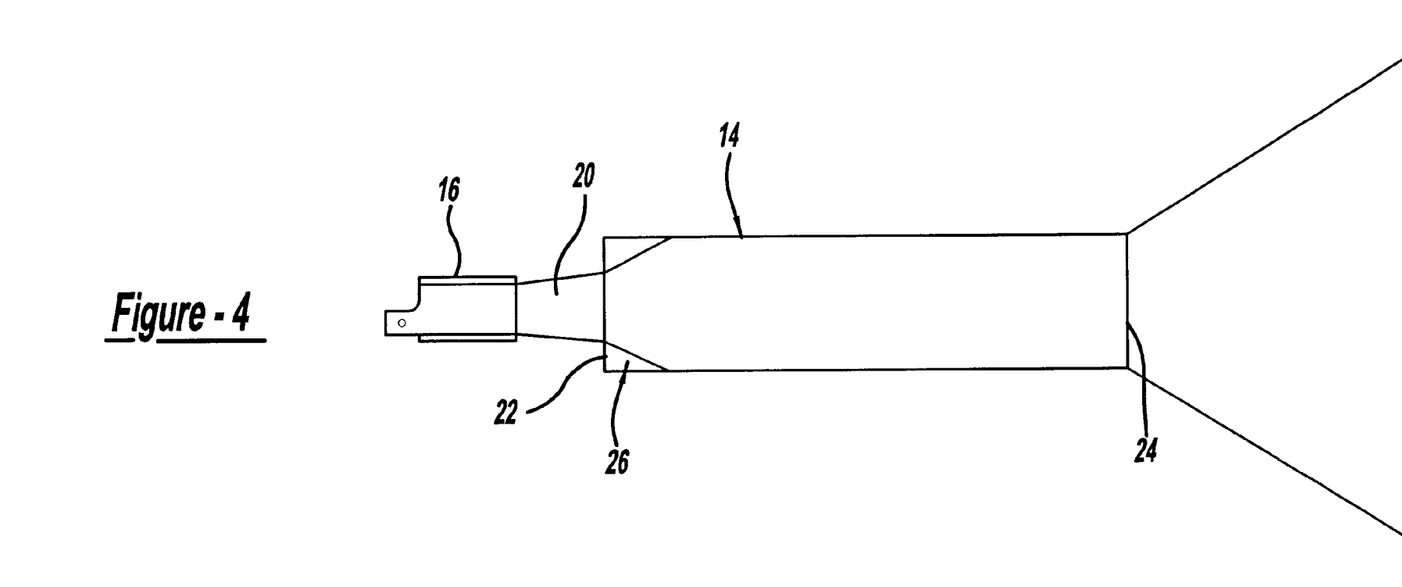
FIG. 4 is a top elevational view of a second embodiment of the present invention.
Figure 5:
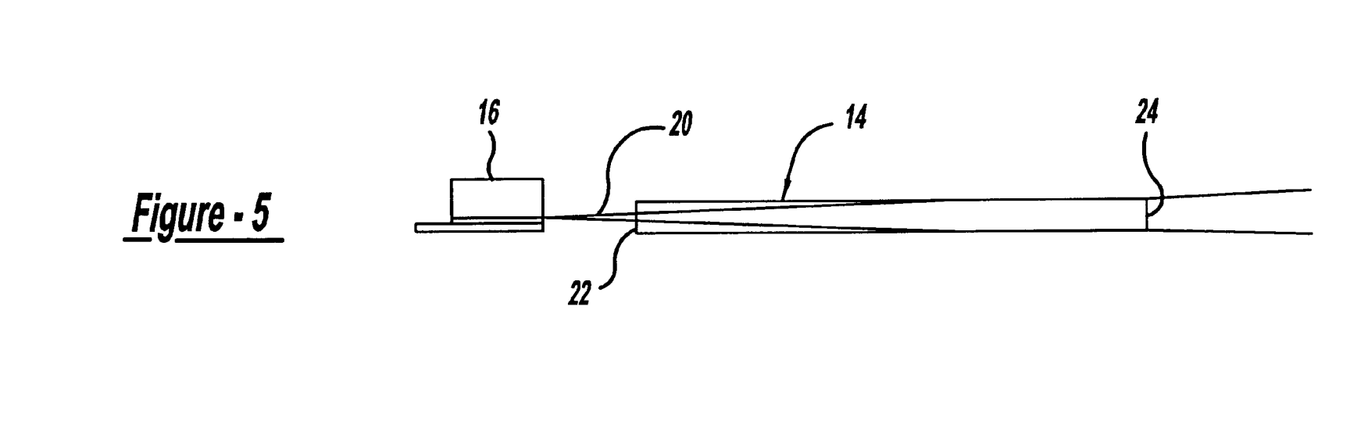
FIG. 5 is a side elevational view of the welding setup shown in FIG. 4.
Figure 6:
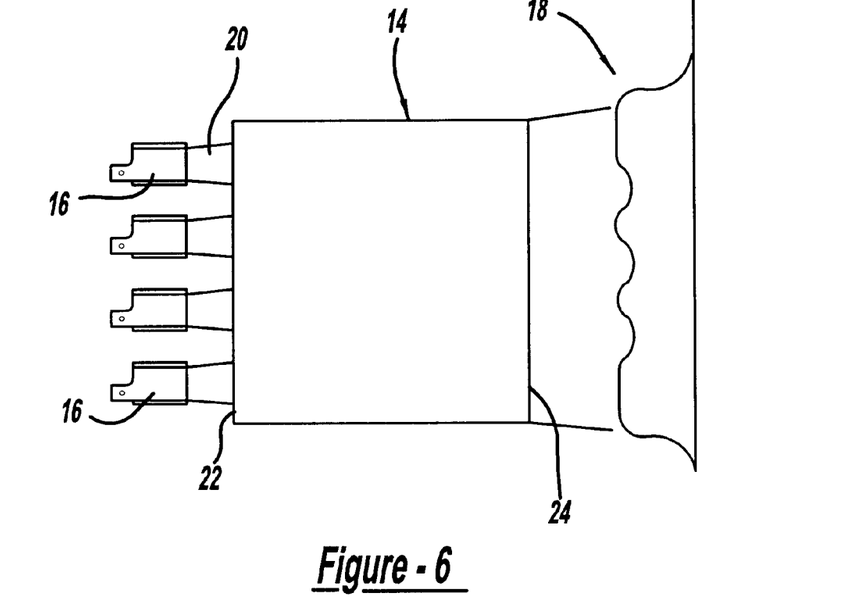
FIG. 6 is a top plan view of a laser diode array according to the present invention without directional diffusion.

In many applications it may be desirable to diffuse or randomize the laser energy within the light guide 14 to a greater degree than is provided by the body of the light guide 14 itself. In these instances, the entrance or exit surfaces 22 and 24, respectively, of the light guide 14 may be prepared to provide directionally specific diffusion. For example, the diffusion provided by the light guide 14 in one direction may be increased, as shown in the area indicated by reference numeral 26, such as by scratching the entrance surface 22 in a peripheral direction with sandpaper (FIG. 4). The scratching may be provided such that the diffusion illustrated in the side view shown in FIG. 5 is the same as that shown in FIG. 3. A variety of techniques generally known in the art may be used to scratch the entrance or exit surfaces 22 and 24, respectively, including chemical etching techniques similar to those used in lithography. This directional diffusion allows the light to scatter through the thickness of the sheet thereby reducing or eliminating any power density variation across the light guide 14. The end result is a more uniform power distribution at the weld surface. In some cases, it may be necessary to mask the "over-spray" of the laser light at the edges. Another technique that can be used to randomize the light is to use many fibers that have random mixing with respect to the input and output location.

Figure 7:
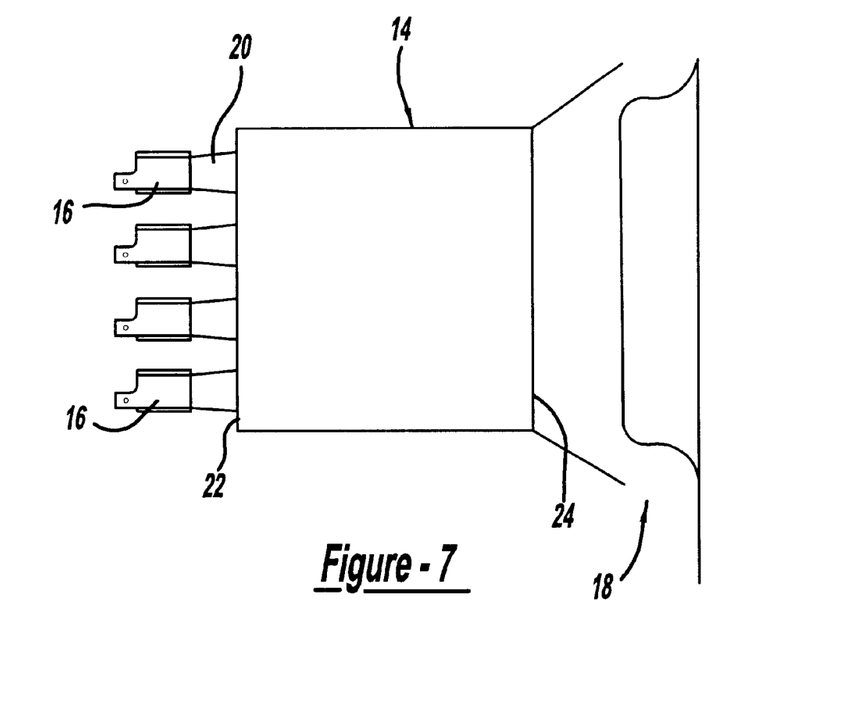
FIG. 7 is a top elevational view similar to that shown in FIG. 6 wherein the invention includes directional diffusion.
Figure 8:
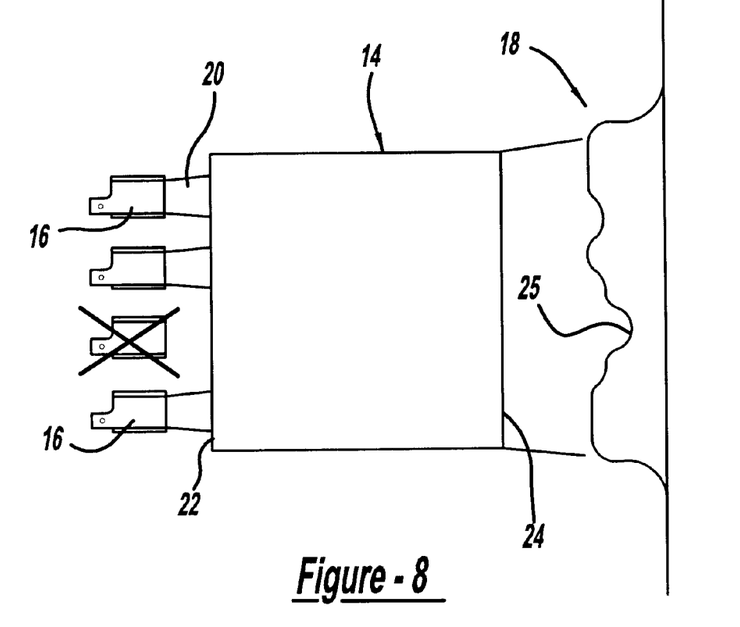
FIG. 8 is a top elevational view similar to that shown in FIG. 6 with a failed diode.
Figure 9:
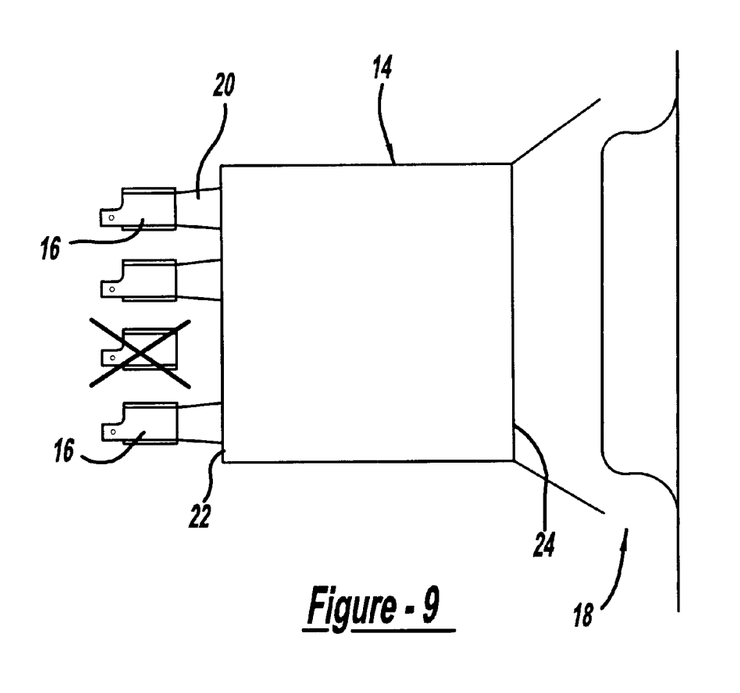
FIG. 9 is a top elevational view similar to that shown in FIG. 7 with a failed diode.
Figure 10:
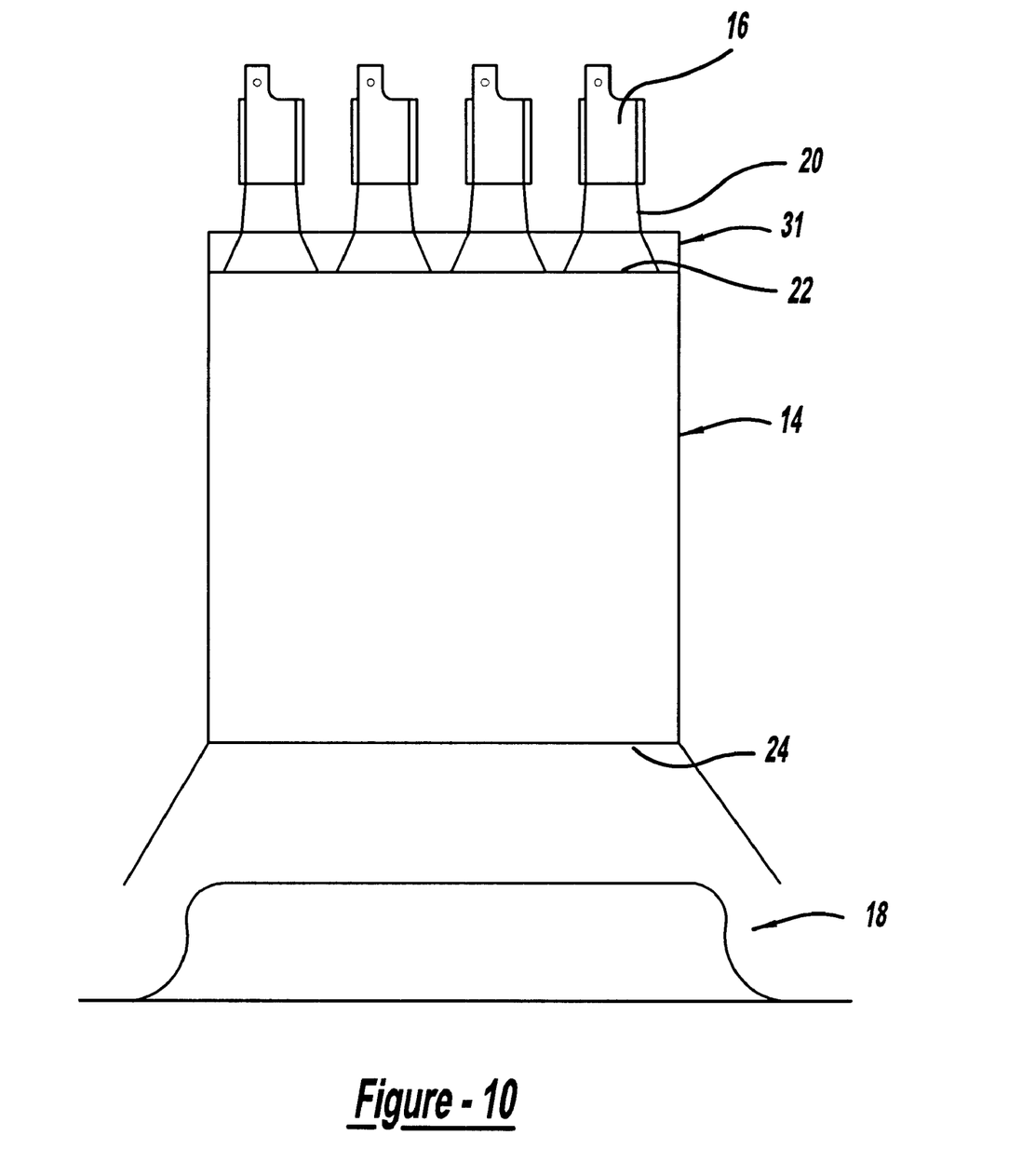
FIG. 10 is a top elevational view of yet another embodiment of the present invention that includes a diffusive lens between the diode array and the entrance surface of the light guide.

Additional benefits provided by directional diffusion include reduction of the adverse effects of a failed diode or emitter and more uniformity when using multiple diodes. More particularly, the laser diode 16 and the light guide 14 configuration without directional diffusion (FIG. 6) generates multiple peaks and valleys as a result of the local effects of the diodes 16. In addition, as shown in FIG. 8, when a diode 16 in this configuration fails, a resulting "dead-spot" 25 may be produced within the weld zone. These "dead-spots" 25 result in insufficient heat applied to the workpiece 18 and therefore non-uniform welds. As shown in FIGS. 7 and 9, the directional diffusion or randomizing provided by the light guide 14 spreads the laser radiation 20 over the entire light guide 14 and, with proper light guide 14 length and internal diffusion, there are very few if any peaks and valleys produced by the local effects of the diodes 16. In addition, as shown in FIG. 9, when a diode 16 fails in this configuration, there is no "dead-spot" produced in the weld.

Directional diffusion or randomizing may be further enhanced or tailored to a specific application by placing a separate lens 31 upstream of the entrance surface 22 (FIG. 10) or downstream of the exit surface 24. Diffusive lenses of this type are generally known in the art.

As noted above, a principle benefit provided by the light guide 14 is that the location and pattern of the laser energy exiting the exit surface 24 of the light guide 14 may be tailored for the specific application and, more particularly, the specific geometry of the weld zone. The flexible sheet can have a two-dimensional or three-dimensional curvature that easily matches complex weld zone geometries. An exemplary two-dimensional curvature is illustrated in FIGS. 11 and 12. More particularly, FIG. 12 represents the one hundred percent internal reflection provided by the light guide 14 so as to change the general orientation and uniformity of the laser beam exiting the exit surface 24 of the light guide 14. This allows the laser radiation 20 to be directed to the weld zone without complex mechanical devices for alignment and manipulation of the laser diodes 16. The diodes 16 may be mounted on virtually any structure including a flat manifold. It should be noted that there is a limitation on the amount of curvature that the light guide 14 can provide and that this limitation is dependent on the application and the relative indexes of refraction between the application and the light guide 14. For example, for a light guide 14 made of silicone rubber, plastic or glass where a ninety percent loss of laser radiation 20 through the light guide 14 is acceptable, a radius of curvature of at least one-half inch may be used.

Figure 13:
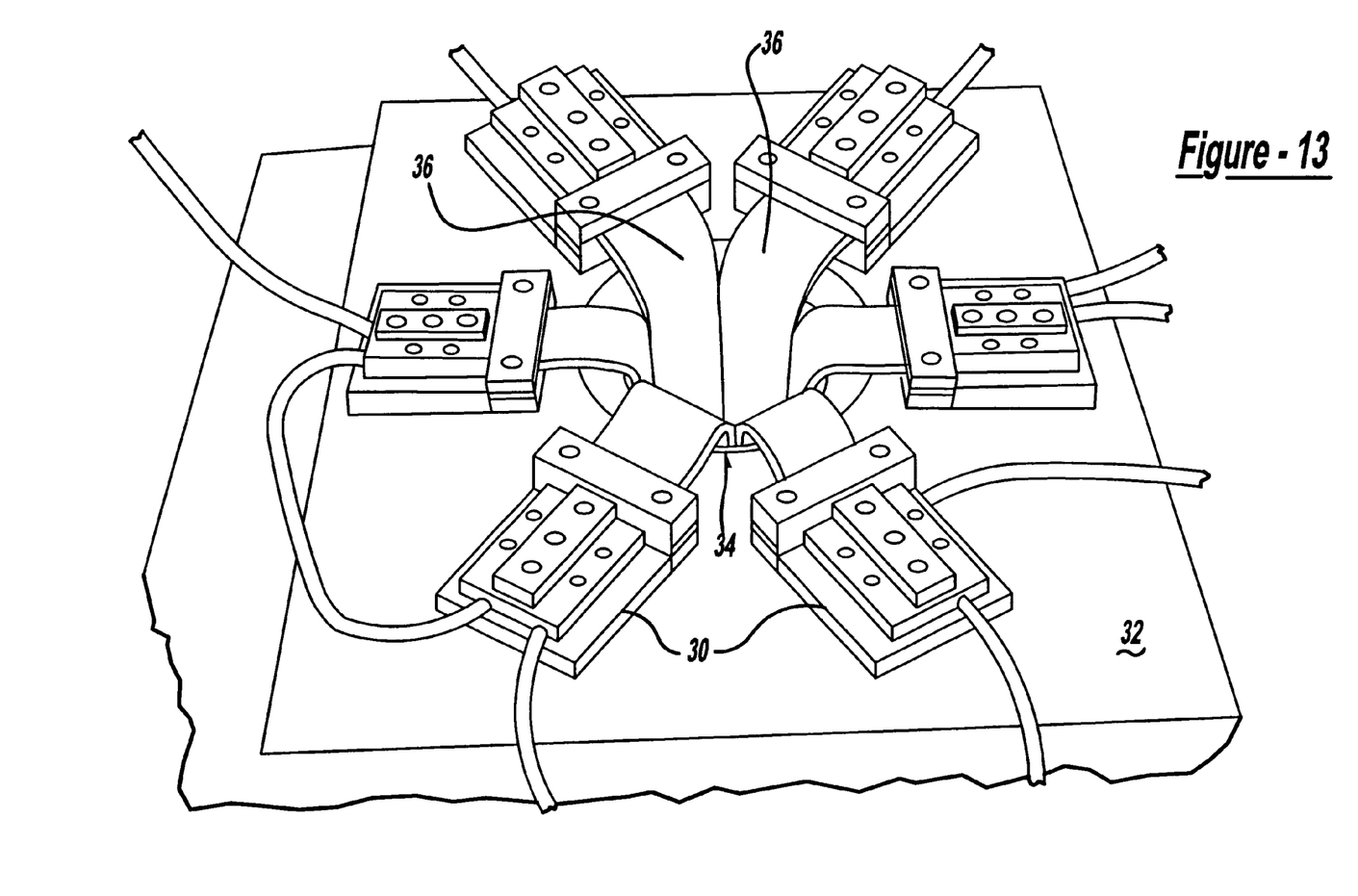
FIG. 13 is a view of a diode array using the light guide to transmit laser energy from the array toward the workpiece.
Figure 14:
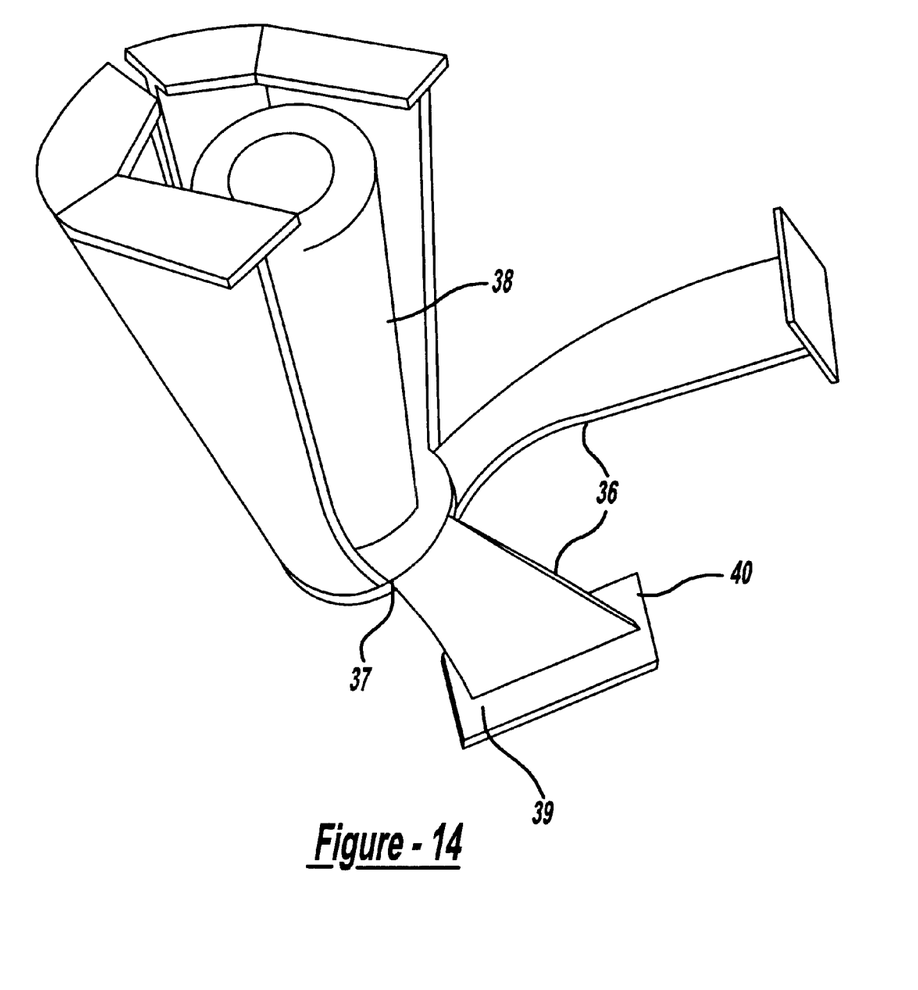
FIG. 14 is a view of a representative mounting structure for a circular weld zone.

An exemplary mounting assembly is illustrated in FIGS. 13 and 14. Specifically, a plurality of laser diodes 30 are mounted on a flat manifold 32 and oriented to project the laser energy toward a central opening 34 in the manifold 32. Light guides 36 are positioned to receive the laser energy generated by each diode 30 and convey the energy through a perpendicular curvature and into the opening 34. As is best illustrated in FIG. 14, an end 37 of the light guide 36 defining the exit surface may be coupled to a mounting structure such as a cylinder 38 in order to secure the various light guides 36 in a configuration that matches the weld zone. In the illustrated embodiments, the exit ends 37 of each light guide 36 are coupled to the mounting cylinder 38 through the use of an adhesive to match a circular weld zone. Various other mounting devices and assemblies may be used to position the exit surfaces 37 of any number of light guides 36 to match complex geometric configurations of a weld zone. FIG. 14 also illustrates that the entrance surfaces 39 of the light guides 36 may be coupled, through silicone rubber or silicone caulking, to an additional sheet 40 formed of transparent material, preferably a sheet of glass such as from a microscope slide, in order to further tailor the diffusion characteristics of the entrance surface 39 to the specific application as discussed above.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An assembly for producing a weld coupling a transparent part of a workpiece to an absorbent part of the workpiece, comprising:
    a laser source that generates laser radiation; and
    a light guide having an entrance surface and an exit surface, said laser radiation entering said light guide at said entrance surface, passing through said light guide and exiting said light guide at said exit surface, said exit surface being spaced from the workpiece and aligned with a weld zone, and said light guide being flexible to permit said light guide to be aligned with said weld zone.

2. The assembly of claim 1 further including a mounting structure, said laser source coupled to said mounting structure, said laser radiation projecting from said laser source in a direction that is out of alignment with said weld zone, said light guide having a curvature and being flexible.

3. The assembly of claim 1 wherein said light guide is formed of a material that diffuses said laser radiation as said laser radiation passes between said entrance and said exit surfaces of said light guide.

4. The assembly of claim 3 wherein said light guide is formed of silicone rubber.

5. The assembly of claim 3 further including an optically transparent plate coupled to said entrance surface of said light guide.

6. The assembly of claim 1 wherein said light guide is formed of a material that mixes said laser radiation as said laser radiation passes between said entrance and said exit surfaces of said light guide.

7. A light guide for conveying laser radiation to a workpiece, comprising:
    a flexible sheet having an entrance surface, an exit surface aligned with a weld zone, and a body extending therebetween, said flexible sheet being internally reflective to the laser radiation so as to retain the laser radiation within said sheet as the laser radiation passes through said entrance surface, said body and said exit surface.

8. The light guide of claim 7 wherein said entrance surface and said exit surface of said flexible sheet are smooth.

9. The light guide of claim 7 wherein said flexible sheet is formed of a transparent thermoplastic.

10. The light guide of claim 7 wherein said flexible sheet is formed of silicone rubber.

11. The light guide of claim 7 wherein said flexible sheet is formed of glass fibers.

12. The light guide of claim 7 including an optically transparent plate adhered to said entrance surface of said flexible sheet.

13. A method for welding parts comprising:
    generating laser radiation;
    passing said laser radiation through a flexible sheet having an entrance surface and an exit surface, said exit surface aligned with a weld zone;
    permitting said laser radiation to exit said flexible sheet at said exit surface; and
    impacting the parts to be welded with said laser radiation to create a weld.

14. The method of claim 13 wherein said entrance surface and said exit surface of said flexible sheet are smooth.

15. The method of claim 13 wherein said flexible sheet is formed of a transparent thermoplastic.

16. The method of claim 13 wherein said flexible sheet is formed of silicone rubber.

17. A method for creating a weld coupling connecting first and second parts comprising:
    coupling a laser source to a mounting structure, said laser source generating laser radiation;
    operatively coupling an entrance end of a light guide to said laser source such that said laser radiation passes into said light guide;
    positioning an exit end of said light guide in spaced relation to the parts and in alignment with the weld coupling to be formed, said exit end having an exit surface similar in contour to a weld zone;
    transmitting laser radiation through said light guide; and permitting said laser radiation to exit said light guide and impact the parts to create the weld coupling.

18. The method of claim 17 wherein said coupling step includes coupling a plurality of laser sources to said mounting structure.

19. The method of claim 18 wherein said light guide is flexible to allow said light guide to be aligned with the parts.

20. The method of claim 19 wherein said light guide is formed of a transparent thermoplastic.

21. The method of claim 19 wherein said light guide is formed of silicone rubber.

22. The method of claim 19 wherein said light guide is formed of glass fibers.

23. The method of claim 17 wherein said transmitting step includes diffusing said laser radiation as it is transmitted through said light guide.

24. The method of claim 17 wherein said transmitting step includes mixing said laser radiation as it is transmitted through said light guide.

* * * * *